(12) United States Patent
Wakeman et al.

(10) Patent No.: US 7,122,147 B2
(45) Date of Patent: Oct. 17, 2006

(54) EMERGENCY CUTTING TORCH SYSTEM

(75) Inventors: Robert W. Wakeman, Watertown, SD (US); Bruce A. Buhler, Watertown, SD (US)

(73) Assignee: Ilinois Tool Works Inc., Glenview, IL (US)

( * ) Notice: Subject to any disclaimer, the term of this patent is extended or adjusted under 35 U.S.C. 154(b) by 348 days.

(21) Appl. No.: 10/454,137

(22) Filed: Jun. 4, 2003

(65) Prior Publication Data
US 2004/0245680 A1 Dec. 9, 2004

(51) Int. Cl.
*B23K 7/00* (2006.01)
(52) U.S. Cl. ......................................... 266/48; 148/196
(58) Field of Classification Search ................. 266/48; 148/196
See application file for complete search history.

(56) References Cited
U.S. PATENT DOCUMENTS 3,898,805 A * 8/1975 Good, Jr ..................... 60/325
4,573,665 A * 3/1986 Strohl et al. .................. 266/48
4,625,949 A 12/1986 Walker ......................... 266/48
4,696,420 A 9/1987 Kulik .......................... 224/275
D322,501 S 12/1991 Legault ....................... D34/24
5,693,286 A 12/1997 Hatanaka et al. ............. 266/67
6,116,623 A 9/2000 Salvucci .................. 280/47.26
D432,283 S 10/2000 Mohns ........................ D34/24
6,224,071 B1 5/2001 Dummer .................... 280/47.2

* cited by examiner

*Primary Examiner*—Scot Kastler
(74) *Attorney, Agent, or Firm*—Fletcher Yoder

(57) ABSTRACT

An emergency cutting torch system adapted to be stored within a compartment of a rescue vehicle. The emergency cutting torch system may comprise a wheeled cart adapted to maintain a first gas storage tank and a second gas storage tank to the wheeled cart in all orientations of the wheeled cart. The emergency cutting torch system may comprise a rotateable lifting member adapted to be rotate outward to extend from the wheeled cart to facilitate engagement with a hook, or other lifting member, for lifting the emergency cutting torch system. The lifting member may rotate to a stowed position to reduce the outer dimensions of the emergency cutting torch system. The emergency cutting torch system may comprise a quick-release system to enable a hose assembly wound on a cart be removed quickly without having to unwind the hose assembly from the cart.

5 Claims, 5 Drawing Sheets

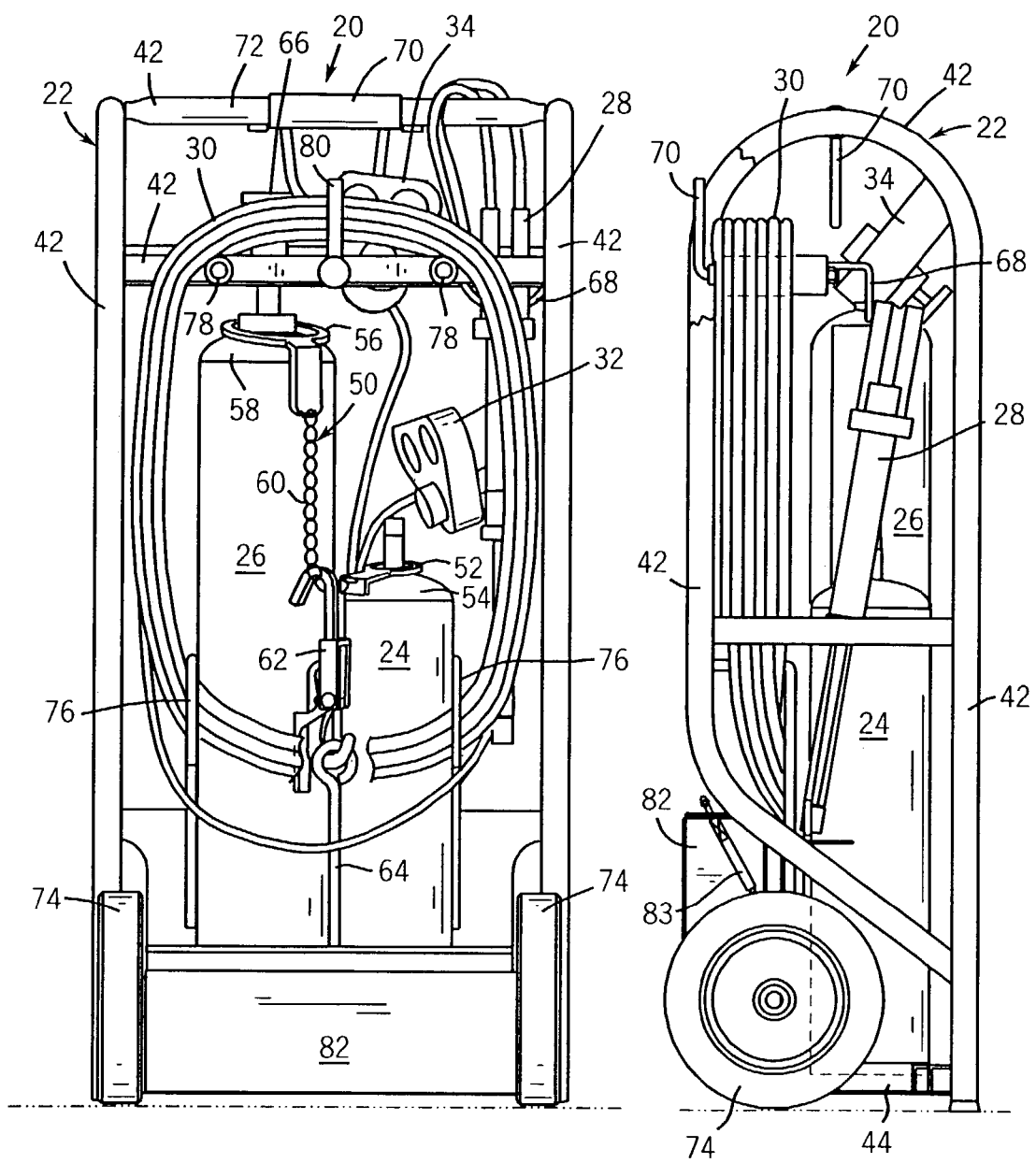

EMERGENCY CUTTING TORCH SYSTEM

BACKGROUND OF THE INVENTION

The present invention relates to emergency response systems, need more particularly to a flame cutting system useful in freeing trapped victims or in entering into or cutting away structures.

Rescue personnel, such as firemen, police, paramedics, etc. occasionally have to extricate people trapped within a structure, such as a car or a collapsed building. The "jaws of life" is a hydraulic tool that is used to extricate people trapped within a structure. The term "jaws of life" refers to several types of tools known as cutters and spreaders. A spreader is used to pull a structure apart. A spreader typically consists of a pair of arms that are inserted into the side of a vehicle or structure. A portable pump or other means is used to provide pressurized hydraulic fluid to the spreader, which causes the arms of the spreader to spread open forcing the side of the vehicle or the structure apart. Conversely, the spreader can also be used to clamp down on a structure to crush any material located between its arms. A cutter is used to cut through a structure like a pair of bolt cutters. However, instead of arms, a cutter typically has curved extensions. As pressurized hydraulic fluid is applied to the cutter, the curved extensions are driven together to cut through the structure.

However, the "jaws of life" are very expensive. A typical system may cost $25,000 or more. Consequently, many potential users of the "jaws of life" cannot afford to purchase them. In addition, the "jaws of life" have many mechanical parts that may fail. Furthermore, a source of hydraulic pressure is required to operate the tool. A loss of hydraulic pressure will render a "jaws of life" inoperative.

A need exists for a simple, low cost system that enables rescue workers to cut through vehicles and structures. In addition, a need exists for a system that may be transported easily to remote locations by rescue workers in standard rescue vehicles.

SUMMARY OF THE INVENTION

The present invention is designed to respond to such needs. It provides an emergency cutting torch system adapted to be stored within a compartment of a rescue vehicle. In an embodiment of the present technique, the emergency cutting torch system comprises a wheeled cart adapted to secure a first gas storage tank and a second gas storage tank to the wheeled cart in multiple or all orientations of the wheeled cart. In another embodiment of the present technique, the emergency cutting torch system comprises a movable lifting member adapted to be moved to extend outward from the wheeled cart to facilitate engagement with a hook, or other lifting member, to lift the emergency cutting torch system. The lifting member is moved to a second position to extend the lifting member inward to reduce the dimensions of the emergency cutting torch system. In another embodiment of the present technique, the emergency cutting torch system comprises a quick-release system to enable a cutting torch hose assembly that is wound on a cart be removed from the cart quickly without unwinding the hose assembly from the cart.

BRIEF DESCRIPTION OF THE DRAWINGS

The foregoing and other advantages and features of the invention will become apparent upon reading the following detailed description and upon reference to the drawings in which:

FIG. 2 is a rear elevational view of the emergency cutting torch system illustrated in FIG. 1;

FIG. 3 is a side elevational view of the emergency cutting torch system illustrated in FIG. 1;

DETAILED DESCRIPTION OF SPECIFIC EMBODIMENTS

Figure 1:
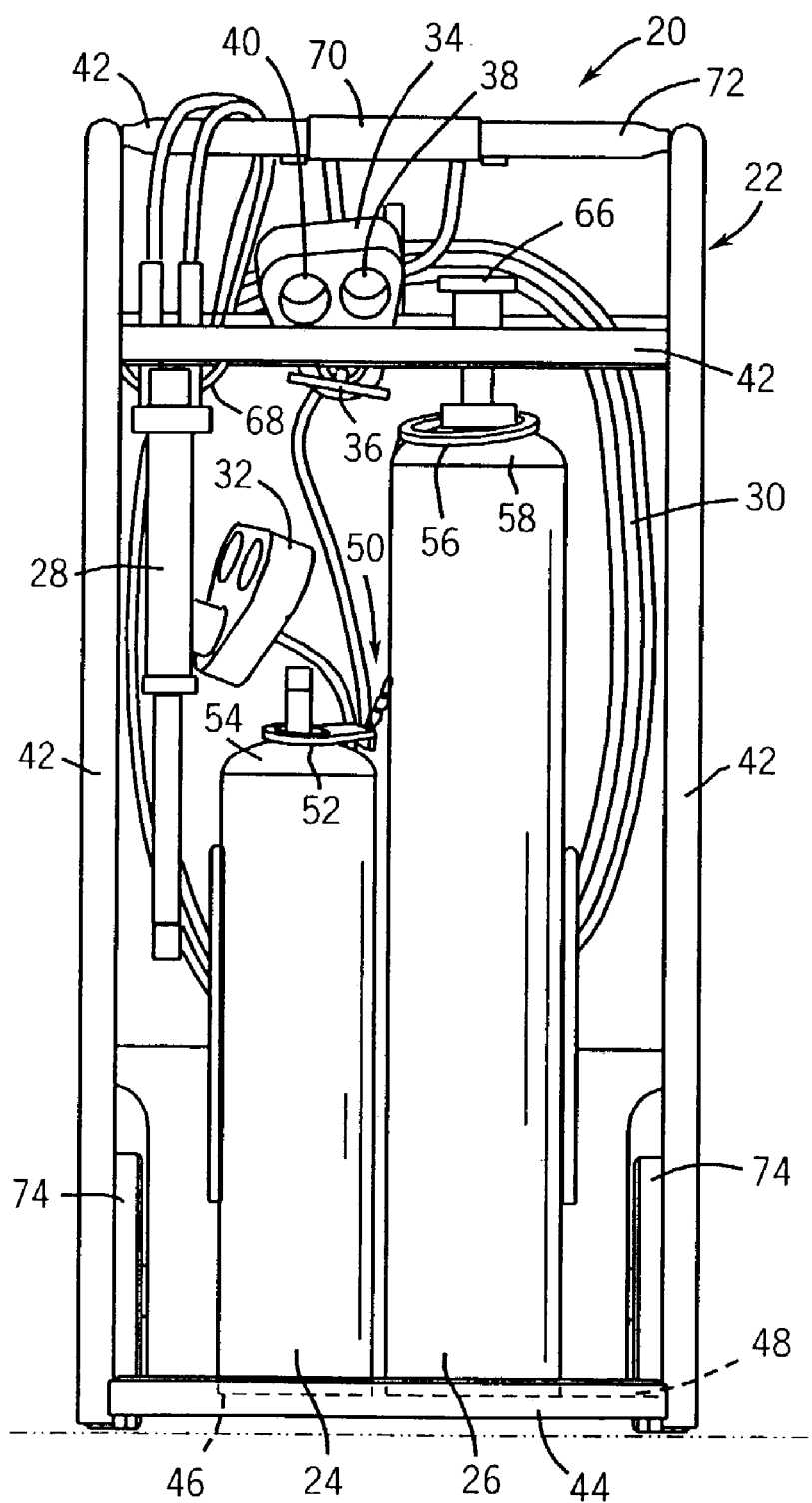
FIG. 1 is a front elevational view of an emergency cutting torch system, in accordance with an embodiment of the present technique.

Referring generally to FIGS. 1–3, an embodiment of an emergency cutting torch system 20 is illustrated. The emergency cutting torch system 20 is adapted to produce a flame to cut through metal and other materials. In the illustrated embodiment, emergency cutting torch system is operable to cut through twelve inches of mild steel. The emergency cutting torch system 20 comprises a wheeled cart 22, a first gas storage tank 24, a second gas storage tank 26, a cutting torch 28, and a flexible hose assembly 30 to couple gas from the first and second gas storage tanks 26 to the cutting torch 28. In this embodiment, the first gas storage tank 24 contains compressed acetylene gas. However, other types of fuel may be used, such as propane. The second gas storage tank 26 contains compressed oxygen. The cutting torch 28 has a lever that controls the amount of oxygen flowing through the torch 28. Typically, the thicker the material, the greater the amount of oxygen flow needed to cut through the material.

The volumes of the first and second gas storage tanks enable the emergency cutting torch system 20 to be small enough to fit into a storage compartment of a rescue vehicle. In the illustrated embodiment, the first gas storage tank 24 has an internal volume of approximately forty cubic feet. The second gas storage tank 26 has an internal volume of approximately eighty cubic feet and a height of approximately thirty-two inches. In addition, the volumes of the first and second gas storage tanks provide a sufficient volume of gas to enable an effective duration of operation before operation must stop to enable one or more of the tanks to be replaced. For example, it has been determined that when continuously cutting quarter-inch plate steel, the first gas storage tank 24 provides a supply of acetylene gas to enable the emergency cutting torch system to produce a flame for approximately 1 hour to 2 hours. The second gas storage tank 24 provides a supply of oxygen that enables the emergency cutting torch system 20 to be produce a flame for approximately 6 to 7 hours. For one-inch plate steel, the fuel gas will last for approximately 30 to 40 minutes and the oxygen will last for approximately 4 to 5 hours. In the illustrated embodiment, the emergency cutting torch system 20 has a weight of approximately 160 lbs. when full of gas. In addition, the emergency cutting torch system 20 has the capability of cutting a piece of mild steel 24 inches thick.

In the illustrated embodiment, the flexible hose assembly 30 comprises two hoses secured together, one hose for fuel gas and one hose for oxygen. The emergency cutting torch system 20 also comprises a first pressure regulator 32 coupled to the first gas storage tank 24 and a second pressure regulator 34 coupled to the second gas storage tank 26. In addition, one of the hoses of the flexible hose assembly 30 is coupled to the first pressure regulator 32 and a second hose is coupled to the second pressure regulator 34. In the illustrated embodiment, each pressure regulator 32 and 34 has a pressure control valve 36, an inlet pressure gage 38, and an outlet pressure gage 40. The pressure regulators enable the flame from the torch to have the desired flows corresponding to the thickness of the metal to be cut.

The wheeled cart 22 comprises a frame 42 and a base 44 adapted to support the first gas storage tank 24 and the second gas storage tank 26. In the illustrated embodiment, the second gas storage tank 26 has a larger diameter than the first gas storage tank 24. The base 44 has a first portion 46 adapted to receive the first gas storage tank 24 and a second portion 48 adapted to receive the second gas storage tank 26. The first and second portions 46, 48 of the base are adapted to obstruct lateral movement of the first gas storage tank 24 and the second gas storage tank 26 relative to the wheeled cart 22.

In the illustrated embodiment, a tank securing assembly 50 is provided that is operable to cooperate with the base 44 to secure axial movement of the first gas storage tank 24 and the second gas storage tank 26 relative to the wheeled cart 22. In the illustrated embodiment, a ring 52 is disposed over a neck portion 54 of first gas storage tank 24. Similarly, a second ring 56 is disposed over a neck portion 56 of second gas storage tank 26. As best illustrated in FIG. 2, the first ring 52 is coupled to the second ring 56 by a chain 60. However, other flexible members may be used, such as a cable. An operator 62 is disposed over the chain and secured to a hook 64 coupled to the base 44.

Referring again to FIGS. 1–2, the operator 62 of the tank securing assembly 50 is adapted to draw the chain 60 towards the base 44, thereby drawing the first ring 52 and second ring 56 towards the base 44. Consequently, the first ring 52 engages the neck portion 54 of the first gas storage tank 24 and the second ring 56 engages the neck portion 58 of the second gas storage tank 26, drawing the first gas storage tank 24 and the second gas storage tank 26 towards the base 44. This action maintains the first gas storage tank 24 and second gas storage tank 26 disposed within the first portion 46 and second portion 48, respectively, of base 44. The tank securing assembly 50 and the base 44 thereby restrict lateral and axial movement of the first and second gas storage tanks relative to the wheeled cart 22 and enable the first and second gas storage tanks to remain secured to the wheeled cart 22 in multiple or all orientations of the wheeled cart 22, even when the wheeled cart 22 is oriented upside-down.

To replace a gas storage tank, the corresponding pressure regulator is removed and the operator 62 actuated to loosen the tank securing assembly 50 so that the corresponding ring may be removed from the tank. In the illustrated embodiment, the second gas storage tank 26 has a shut-off valve 66 to enable the second gas storage tank 26 to be isolated during installation and removal. The first gas storage tank 24 may or may not have a corresponding shut-off valve.

Referring generally to FIGS. 1–3, in the illustrated embodiment, frame 42 comprises a cutting torch holding ring 68. The cutting torch holding ring 68 is adapted to receive the cutting torch 28. In addition, the frame 42 of the wheeled cart 22 has a rotatable lifting loop 70 secured to a top bar 72 of the frame 42. The lifting loop 70 is adapted to enable an external lifting member, such as a crane hook, to lift the emergency cutting torch system 20. The lifting loop 70 is operable to be rotated outward to enable a hook, or other member, to engage the lifting loop 70. In addition, the lifting loop 70 is operable to rotate inward to reduce the height of the emergency cutting torch system 20 during storage.

The wheeled cart 22 also comprises a pair of wheels 74 for moving the emergency cutting torch system 20. The wheeled cart 22 is adapted so that the wheels 74 do not extend beyond the sides of frame 42, minimizing the width of the wheeled cart 22. In addition, the wheels 74 are disposed relative to frame 42 so that base 44 will sit flat on a horizontal surface. Wheels 74 are disposed on frame 42 so that they extend slightly beyond the rear of frame 42. To move wheeled cart 22, the cart 22 is rotated backwards and rolled on wheels 74.

Referring generally to FIG. 2, the frame 42 is adapted to enable the flexible hose to be wound onto frame 42 for storage. In the illustrated embodiment, frame 42 has a pair of first winding members 76 and a pair of second winding members 78 for winding the hose 30 on the wheeled cart 22. Each winding member 76 extends outward in a direction perpendicular to the frame 42 and then extends outward in a direction parallel to the frame 42. The portion of each winding member 76 that extends outward in a direction perpendicular to the frame 42 forms a surface for winding the hose assembly 30. The portion that extends outward in a direction parallel to the frame 42 is adapted to prevent the hose assembly 30 from being removed from the frame 42 once the hose assembly 30 is wound onto the frame 42. Each second winding member 78 extends outward from the frame 42 to form a surface for winding the hose assembly 30. In the illustrated embodiment, a spring loaded retaining member 80 is provided.

In the illustrated embodiment, a biased retaining member 80 is provided to enable the flexible hose assembly 30 to be removed from the frame 22 without having to unwind the flexible hose assembly 30 from the frame 42. The spring loaded retaining member 80 is spring-biased to maintain the retaining member 80 in a oriented in a desired orientation. During storage, the retaining member 80 is disposed in an upward orientation, in this view, so that the retaining member 80 obstructs movement of the flexible hose assembly 30 from the second winding members 78. The retaining member 80, the first winding members 76, and the second winding members 78 cooperate to maintain the flexible hose assembly 30 wound on the frame 42 during storage. In this orientation of the retaining member 80, the hose assembly 30 may be unwound from the frame 42 to remove the hose assembly 30 from the frame. In the illustrated embodiment, the retaining member 80 is rotatable to enable the retaining member 80 to be removed as an obstruction to the hose assembly 30. In this orientation of the retaining member 80, the hose assembly 30 may be pulled from the frame 22 without having to unwind the flexible hose assembly 30 from the frame 42. Thus, the hose assembly 30 may be unwound as the cutting torch 28 is drawn towards a work location away from the wheeled cart 22.

Referring generally to FIGS. 2 and 3, the wheeled cart 22 also comprises a hinged box 82 for storing accessories, such as gloves, torch tips, goggles, etc. The illustrated hinged box 82 has a spring catch 83 that maintains the hinged box open, once the box 82 is open. In addition, the catch 83 limits the movement of the hinged box 82 so that the contents are easily accessible.

Figure 4:
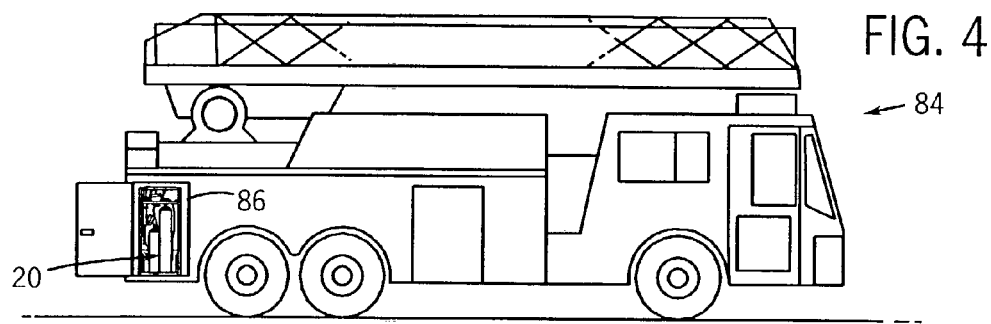
FIG. 4 is an elevational view of an rescue vehicle transporting an emergency cutting torch system, in accordance with an embodiment of the present technique.

Referring generally to FIG. 4, a rescue vehicle 84 is illustrated. In the illustrated embodiment, rescue vehicle 84 is a ladder truck. However, the rescue vehicle 84 may be any of a variety of vehicles used in emergency operations, such as fire engines, paramedic trucks, pickup trucks, etc. The emergency cutting torch system 20 is adapted to be disposed within a storage compartment 86 of rescue vehicle 84. As indicated above, in this embodiment, the first gas storage tank 24 has a volume of approximately forty cubic feet and the second gas storage tank 26 has a volume of approximately eighty cubic feet. In addition, the second gas storage tank is approximately thirty-two inches tall. In the illustrated embodiment, the emergency cutting torch system 20 is adapted to have dimensions of approximately 18 inches by 11.75 inches by 38 inches.

Figure 5:
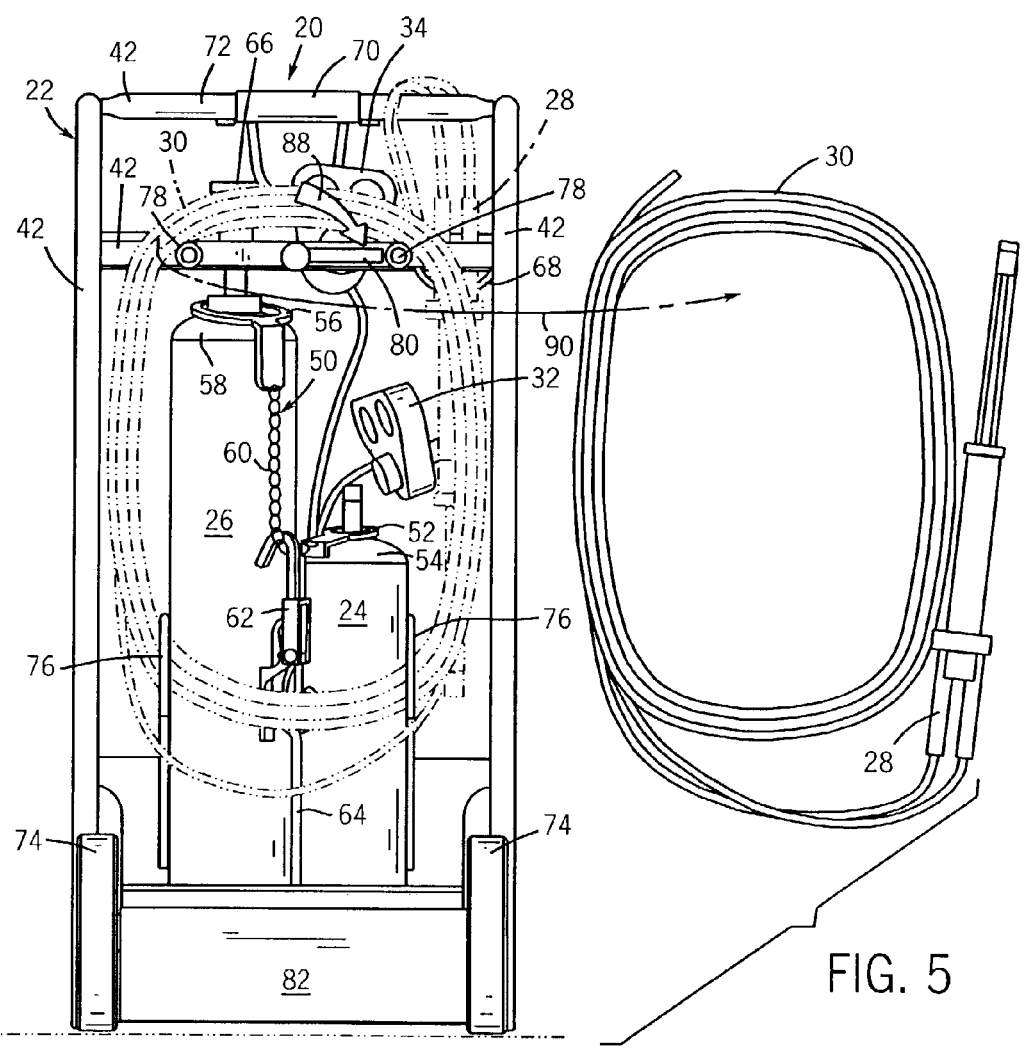
FIG. 5 is an elevational view of an emergency cutting torch system illustrating a flexible hose assembly being removed from a wheeled cart without having to unwind the flexible hose assembly from the wheeled cart, in accordance with an embodiment of the present technique.

Referring generally to FIG. 5, when a rescue worker desires to use the emergency cutting torch system 20, the emergency cutting torch system 20 is removed from the compartment 86 and operated to cut the desired material with a torch flame. The emergency cutting torch system 20 may be rolled to a desired location. In addition, the spring-loaded retaining member 80 may be rotated, as represented by arrow 88, to remove the retaining member 80 as an obstruction to enable the flexible hose assembly 30 to be released from the cart 22 quickly, without having to unwind the flexible hose assembly 30 from the cart 22. With the retaining member rotated, the upper portion of the flexible hose 30 is drawn outward from the second winding members 78, as represented by arrow 90. Once the upper portion of the flexible hose assembly 30 is free of the second winding members 78, the flexible hose assembly 30 is lowered so that the hose assembly 30 is free of the first winding members 76. The flexible hose assembly 30 is then unwound as the cutting torch 28 is displaced relative to the wheeled cart 22.

Figure 6:
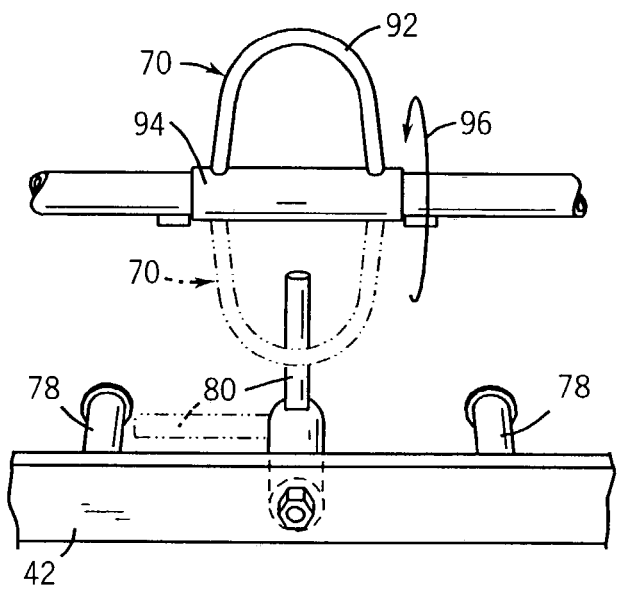
FIG. 6 is an elevational view of an emergency cutting torch system illustrating a movable lifting loop adapted to engage an external lifting device to lift the emergency cutting torch system, in accordance with an embodiment of the present technique.
Figure 7:
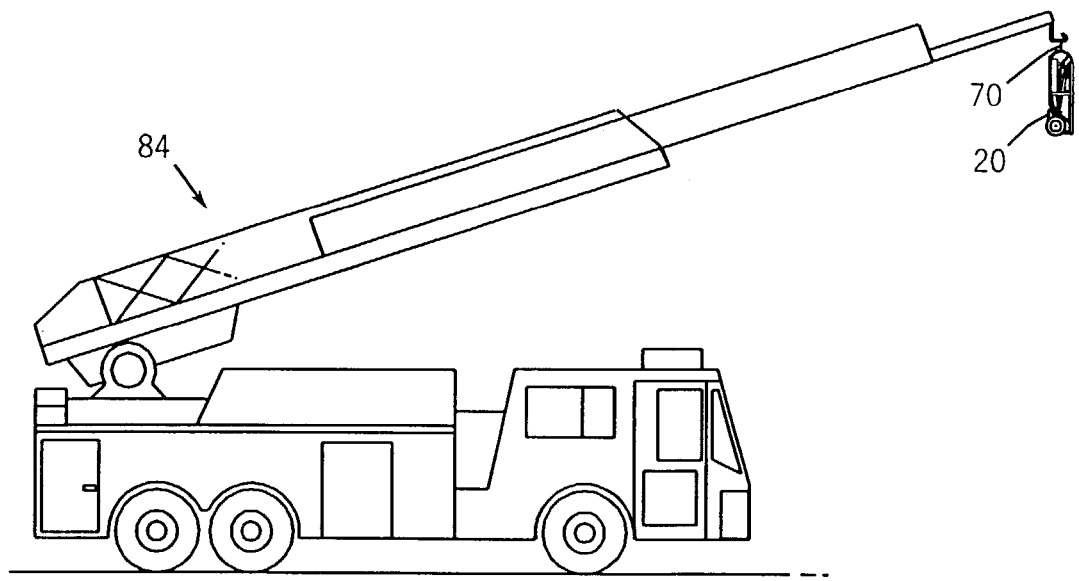
FIG. 7 is an elevational view of an emergency cutting torch system being lifted by the movable lifting loop illustrated in FIG. 6.

Referring generally to FIGS. 6 and 7, the emergency cutting torch system 20 is adapted to be lifted by an external device, such as ladder truck 54, a crane, etc. As best illustrated in FIG. 6, the swivel loop 70 is adapted with a loop portion 92 and a tubular portion 94. The swivel loop 70 is adapted to rotate around the top bar 72 of frame 42 from a stowed position to an outward position, as represented by arrow 96. The outward position facilitates engaging the swivel loop 70 with a lifting member, such as a hook. When the emergency cutting torch system 20 is not in use, the swivel loop 70 returns to its stowed position, such that the loop 92 extends inward, rather than outward from the frame 42. The stowed position of the swivel loop 70 reduces the volume required for storing the emergency cutting torch system 20.

Figure 8:
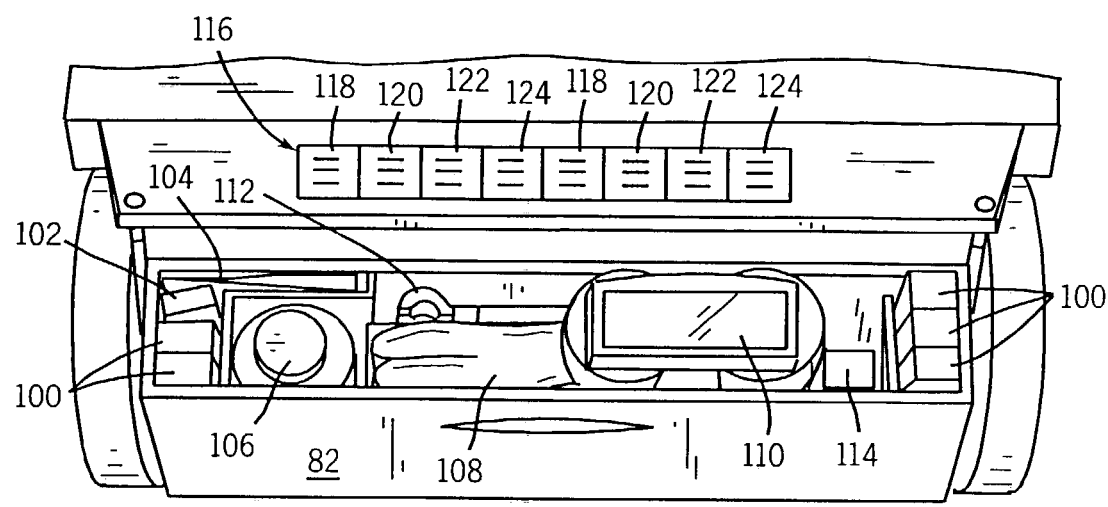
FIG. 8 is a view of a hinged box and its contents in an embodiment of an emergency cutting torch system.

Referring generally to FIG. 8, the hinged box 82 is adapted to store a plurality of accessories. In the illustrated embodiment, the hinged box 82 contains cutting torch tips 100 of a plurality of different sizes for cutting through metals of different thickness. In addition, the hinged box 82 contains a cutting torch tip cleaner 102, an owner's manual with operating instructions 104, and a bottle 106 of leak detection fluid for checking the tightness of fittings, such as the pressure regulators and gas storage tanks. In addition, the hinged box 82 contains a pair of welder's gloves 108, goggles 110, a multiple-purpose wrench 112 for making and breaking various gas connections, and a striker 114 to enable a user to strike a flame with the emergency cutting torch system 20.

In addition, a table 116 is provided on the top of the hinged box 82 to provide information to a user. The illustrated table 116 has a first column 118 that lists the part number of a plurality of torch tips. In addition, the table 116 provides a column 120 that indicates the thickness of metal that each torch tip can cut. In addition, the table 116 has a third column that indicates the preferred oxygen pressure for use with each torch tip, and a fourth column that indicates the preferred acetylene pressure for use with each torch tip. Thus, a rescue worker quickly can identify the proper size of torch tip based on the thickness of the metal to be cut and also identify the preferred oxygen and acetylene pressures for the job.

The emergency cutting torch system 20 provides simple, low cost alternative to the "jaws of life." The emergency cutting torch system 20 enables rescue workers to cut through mild steel at least 24 inches thick. In addition, the emergency cutting torch system 20 is compact and will fit within a storage compartment of a rescue vehicle. The emergency cutting torch system 20 does not require a source of power, either hydraulic or electric. Furthermore, all of the accessories needed to operate the emergency cutting torch system 20 are provided. In addition, the emergency cutting torch system 20 is adapted to be set-up quickly for operation.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An emergency cutting torch assembly, comprising:
   a cutting torch; and
   a wheeled cart adapted to support at least one gas storage tank coupleable to the cutting torch, the wheeled cart comprising a securing assembly adapted to block axial movement of the at least one gas storage tank and to maintain the at least one gas storage tank secured to the wheeled cart in an upright position of the cart and an inverted position of the cart;
   wherein the at least one storage tank comprises a first gas storage tank and a second gas storage tank, and wherein the securing assembly comprises a base adapted to restrict lateral movement of the first and second gas storage tanks and a securing mechanism adapted to restrict axial movement of the first and second gas storage tanks, the first and second gas storage tanks comprising a cylinder having a neck and the securing mechanism comprising a first ring adapted to be disposed against the neck of the first gas storage tank, a second ring adapted to be disposed against the neck of the second gas storage tank, and a securing member coupleable to the wheeled cart and adapted to draw the first and second rings towards the base of the wheeled cart.

2. The emergency cutting torch assembly as recited in claim 1, wherein the first and second gas storage tanks are cylinders having different diameters and the base comprises a first portion and a second portion adapted to receive the first and second gas storage tanks, respectively.

3. The emergency cutting torch assembly as recited in claim 1, wherein the securing mechanism comprises a flexible member secured between the first and second rings and the securing member comprises an operator coupleable to the flexible member and adapted to be operable to draw the flexible member towards the base of the wheeled cart.

4. The emergency cutting torch assembly as recited in claim 1, comprising a cutting torch coupled to the first and second gas storage tanks by a flexible hose assembly, wherein the first gas storage tank contains a compressed fuel gas and the second gas storage tank contains compressed oxygen.

5. The emergency cutting torch assembly as recited in claim 1, comprising a hinged storage bin containing a plurality of accessories for operating the emergency cutting torch system.

* * * * *